United States Patent
Vanstone et al.

(10) Patent No.: US 8,964,971 B2
(45) Date of Patent: Feb. 24, 2015

(54) METHOD OF PROVIDING TEXT REPRESENTATION OF A CRYPTOGRAPHIC VALUE

(75) Inventors: Scott A. Vanstone, Campbellville (CA); Daniel R. Brown, Mississauga (CA)

(73) Assignee: Certicom Corp., Mississauga (CA)

( * ) Notice: Subject to any disclaimer, the term of this patent is extended or adjusted under 35 U.S.C. 154(b) by 957 days.

(21) Appl. No.: 12/171,398

(22) Filed: Jul. 11, 2008

(65) Prior Publication Data
US 2009/0022309 A1     Jan. 22, 2009

Related U.S. Application Data

(60) Provisional application No. 60/950,213, filed on Jul. 17, 2007.

(51) Int. Cl.
    H04K 1/00    (2006.01)
    H04L 9/30    (2006.01)
    G06F 17/22   (2006.01)

(52) U.S. Cl.
    CPC .......... H04L 9/3073 (2013.01); G06F 17/2264 (2013.01); *H04L 2209/16* (2013.01); *H04L 2209/30* (2013.01); *H04L 2209/608* (2013.01)
    USPC .......................................... 380/28

(58) Field of Classification Search
    USPC .......................................... 380/28
    See application file for complete search history.

(56) References Cited

U.S. PATENT DOCUMENTS

| | | | |
|---|---|---|---|
| 6,111,954 A * | 8/2000 | Rhoads | 380/54 |
| 7,167,825 B1 * | 1/2007 | Potter | 704/9 |
| 7,194,618 B1 | 3/2007 | Suominen | |
| 7,599,491 B2 * | 10/2009 | Lambert | 380/30 |
| 2001/0037200 A1 * | 11/2001 | Ogawa et al. | 704/246 |
| 2002/0108042 A1 | 8/2002 | Oka et al. | |
| 2004/0170279 A1 * | 9/2004 | Wilson et al. | 380/252 |
| 2005/0086639 A1 | 4/2005 | Min et al. | |
| 2006/0026439 A1 | 2/2006 | Moseley | |
| 2006/0106721 A1 | 5/2006 | Hori et al. | |
| 2007/0157026 A1 | 7/2007 | Zimmermann | |
| 2008/0270117 A1 * | 10/2008 | Grinblat | 704/9 |

FOREIGN PATENT DOCUMENTS

| | | |
|---|---|---|
| EP | 1746561 A1 | 1/2007 |
| EP | 1279249 B1 | 8/2007 |
| JP | 03-236084 | 10/1991 |
| JP | 09-114785 | 5/1997 |
| WO | WO 03/007539 A1 | 1/2003 |

OTHER PUBLICATIONS

Wu, J. and Stinson D.R., "Authorship Proof for Textual Document", 2007; Cryptalogy ePrint Archive, Report 2007/042; Available at http://eprint.iacr.org/2007/042.pdf.

(Continued)

*Primary Examiner* — Esther Benoit
(74) *Attorney, Agent, or Firm* — Shahrzad Esmaili; Blake, Cassels & Graydon LLP

(57) ABSTRACT

A method of representing crytographic values in text form is described. The text representation is formed from words selected from a vocabulary, which may include a collection of pseudowords. The text representations can be further transformed to a paragraph in an apparently grammatically correct form.

17 Claims, 6 Drawing Sheets

(56) References Cited

OTHER PUBLICATIONS

Boneh, D. et al; "Identity-Based Encryption from the Weil Pairing"; SIAM J. of Computing; 2003; pp. 586 to 615; vol. 32, No. 3.

Brown, D.R.L. et al.; "Provably Secure Implicit Certificate Schemes"; Research Report, University of Waterloo, Dept. of C&O; Nov. 2000. Available at www.cacr.math.uwaterloo.ca/techreports/2000/corr2000-55.ps.

Haller, N.; "The S/KEU One-Time Password System"; IETF RFC 1760; Feb. 1995. Available at www.ietf.org/rfc/rfc/760.txt.

Pintsov L. et al.; "Postal Revenue Collection in the Digital Age"; FC 2000; 2001; pp. 105 to 120; Springer-Verlag.

Shamir, A.; "Identity-Based Cryptosystems and Signature Schemes"; Advances in Cryptology: CRYPTO '84; pp. 47 to 53; Springer-Verlag.

Zimmerman, P.R.; PGPfone: Pretty good privacy phone owner's manual; Appendix E: Biometric Word Lists; Jan. 1996. Available at http://web.mit.edu/network/pgpfone/manual/index.html.

Search Report from PCT/CA2008/001268 dated Aug. 28, 2008.

Haller, N. et al.; "A One-Time Password System"; May 1996; RFC 1938; IETF Standard; IETF Engineering Task Force; ISSN: 0000-0003.

Lenstra, A.K.; "Generating RSA Moduli with a Predetermined Portion"; Oct. 1, 1998; pp. 1 to 10; LNCS; ISBN: 978-3-540-24128-7.

Horbach, C.; Supplementary Search Report from corresponding European Application No. 08783191.3; search completed Sep. 9, 2011.

Jeyaraman, S. et al.; "Have the cake and eat it too—Infusing usability into text-password based authentication systems"; Proceedings of the $21^{st}$ Annual computer Security Applications Conference (ACSAC 2005), Dec. 5 to 9, 2005, Piscataway, NJ, U.S.A; IEEE; ISBN: 978-0-7695-2461-0.

Weinshall, D. et al.: "Passwords you'll never forget, but can't recall"; Extended abstracts of the 2004 Conference on Human factors and computing systems (CHI 2004), Apr. 24 to 29, 2004, Vienna, Austria; pp. 1399 to 1402; ISBN: 978-1-58-113703-3.

Atallah, M.J. et al.; "Natural Language Processing for Information Assurance and Security: An Overview and Implementation"; Proceedings of the New Security Paradigms Workshop (NSPW), Sep. 18 to 22, 2000, Ballycotton, County Cork, Ireland; pp. 51 to 65; ACM; ISBN: 978-1-58113-260-1.

Topkara, U.; "The Hiding Virtues of Ambiguity: Quantifiably Resilient Watermarking of Natural Language Text through Synonym Substitutions"; MM&Sec '06, Sep. 26 to 27, Geneva, Switzerland; pp. 164 to 174; ISBN: 978-1-59593-493-2.

Lee, K.-W. et al.; "Coinware for Multilingual Passphrase Generating and Its Application for Chinese Language Password"; Proceedings of the 2006 International Conference on Computational Intelligence and Security (CIS 2006); Nov. 2006; pp. 1511 to 1514; http://ieeeexplore.ieee.org/xpls/abs_all.jsp?arnumber=4076218.

Juola, P. et al.; "Whole-word Phonetic Distances and the PGPfone Alphabet"; Proceedings of the Fourth International Conference on Spoken Language (ICSLP 96); Oct. 1996; pp. 98 to 101; http://ieeeexplore.ieee.org/xpls/abs_all.jsp?arnumber=607046.

\* cited by examiner

METHOD OF PROVIDING TEXT REPRESENTATION OF A CRYPTOGRAPHIC VALUE

CROSS-REFERENCE TO RELATED APPLICATIONS

This application claims priority from U.S. Provisional Patent Application No. 60/950,213 filed on Jul. 17, 2007, hereby incorporated by reference.

FIELD OF INVENTION

The invention relates generally to the field of cryptography. In particular, the invention relates to representing a cryptographic value in text form.

BACKGROUND OF INVENTION

Public key cryptography utilizes a public key and a private key that are mathematically related. The relationship is such that the public key can readily be computed from the private key but computation of the private key from the public key is considered infeasible. The private key is thus maintained secret. The keys are used in a variety of well known protocols to hide or sign messages.

As a cryptographic value, a public key or its representation generally is not easily manageable by a user. Generally speaking, cryptographic algorithms involve values that are random or indistinguishable from random characters within a certain space. People generally have difficulty managing a long string of characters that resembles a random collection of letters and digits. To provide adequate security, the size of such a space is often chosen so that exhaustive search by computers of current technology becomes infeasible. A space of $2^{80}$ is considered out of reach today. Representing a cryptographic value in such a space generally takes at least 80 bits, or ten bytes. A value of ten bytes corresponds to twenty hexadecimal digits. Some cryptographic values, such as elliptic curve public keys and hash values, must generally be twice as long as this to have an equal security level. The minimal security level would involve a representation of 40 hexadecimal digits. As computation power or computation techniques advance, longer representations will become desirable or necessary. Other cryptographic values, such as DSA and RSA keys, have even longer representations, with 256 hexadecimal digits in order to maintain the same security level.

Random values of such sizes, even just 20 hexadecimal digits long, are quite difficult for users to manage without error. In particular, users may have difficulty
1. recalling such random values without assistance,
2. recognizing such random values even if seen before,
3. communicating such values by voice to other users, or
4. transcribing such values via print or display.

Because of these difficulties, user interfaces to cryptographic protocols seldom give users access to the cryptographic values. This may be because it is generally believed that such access would be useless. Occasionally, cryptographic values are made optionally accessible to users. The most common cryptographic value that users are likely to encounter is a public key. Many protocols optionally display a representation of a public key in a certificate to the user.

For example, when an SSL or TLS client in a web browser receives a server certificate which is not signed by a trusted certification authority ("CA"), the SSL or TSL client commonly displays a warning to the user. The warning message typically notifies the user that the certificate cannot be trusted, displays the name of the purported owner and issuer of the certificate. Often an option is given to the user to either not trust the certificate, trust the certificate once, or to always trust it. Some clients also display the public key in hexadecimal or Base64 form to the user. Users generally cannot make use of the displayed public key, because they have nothing to corroborate against. Even if the user did have some authentic source to verify the public key against, a hexadecimal or Base64 representation would make the verification a nuisance.

These warning messages present a danger to users. Suppose a user tries to revisit a familiar, secure but uncertified site, but accidentally misspells the web address. An attacker could create a web-site at the mistaken address. The attacker could create a web page that looks identical to the correct web-site. The attacker can also create a server certificate for the web-site. The attacker may not be able to get the server certificate certified by a trusted CA, because the trusted CA may do due diligence against such attacks before issuing server certificates. However, the attacker can issue a certificate to itself.

When a browser client encounters such a certificate, it will recognize that the certificate is not certified by a trusted CA and accordingly warn the user. Some users may ignore the warning message and connect to the site regardless. Other users may reject the web-site, without regard to the warning. A third class of users, perhaps the majority, may glance at the name of the certificate presented in the warning message and choose to accept the certificate once (for one session).

This third class of users would inspect the name. Because the certificate has been issued by the attacker, the attacker can choose a valid name, one for the correct site. If the browser matches the name, against the URL, then the attacker can use the matched URL. The false URL is very close to the true URL, however, so the user may not notice the difference. (Some browsers might not re-display a correctly matched URL in the warning message, since it is already displayed in the address line of the browser.)

Therefore it is likely that this third class of users will accept the certificate, at least for one session. This is made more likely by the fact that many legitimate web-sites cannot afford to purchase server certificates from trusted CAs, but still want encryption, so instead just issue their own certificates. Many users have been accustomed to such sites, and are more likely to accept certificates.

The negative consequence of accepting the attacker's certificate is that the user may think he or she is communicating with the true web-site. The user may obtain false information from the false web-site. The user may also enter information into the false web-site. In particular, the user may enter a password. The attacker may obtain the password, and use it to impersonate the user at the true web-site. If the true web-site is an on-line banking site, the attacker may be able to withdraw funds from the user's bank account.

It is therefore desirable to communicate cryptographic values to human recipients in a text representation, which tends to have a less random form. Solutions have been proposed in the context of one-time passwords that are hashes of salted conventional passwords. In one system, a stream of 64 bits is divided into six segments of 11 bits with one of the segments padded to 11 bits. Each segment is then rendered as a word taken from a dictionary of 2048 words. The words chosen have four or fewer letters, with the purpose to make them easier to type, so that the number of key strokes is limited. The aim is to keep the error rate lower than for hexadecimal or Base64 data, because the words chosen are valid English words.

A number of security deficiencies, however, exist in using lists of English words. Audio recordings of speech can be re-spliced to form word lists. Thus if speech is used for authentication then alternative representations may be advantageous. At a textual level, word lists may not offer as much efficiency or may not fit well enough with existing text formats, such as electronic mail addresses.

It is an object of the present invention to mitigate or obviate at least one of the above mentioned disadvantages.

SUMMARY OF INVENTION

In one aspect of the invention, there is provided a general method of communicating a cryptographic value to a human recipient. The method includes the steps of: selecting a vocabulary; representing the cryptographic value as a bit string; and converting the bit string to a text. The text is formed of words selected from the vocabulary in accordance with a loss-less relationship.

In another aspect of the invention, there is provided a method of communicating a cryptographic value to a human user. The method includes selecting a vocabulary; representing the cryptographic value as a bit string; converting the bit string to a text using words selected from the vocabulary in accordance with a pre-determined loss-less relationship; and communicating the text to the human user.

In another aspect of the invention, the method includes selecting a vocabulary; representing the cryptographic value as a bit string; converting the bit string to grammatically correct text formed of words selected from the vocabulary; and communicating the grammatically correct text to the user.

In yet another aspect of the invention, there is provided a method of signing a message by a user. The method includes the steps of: computing a hash value of the message; converting the hash value to a text using a conversion method described herein; receiving an audio recording, the audio recording capturing voice signal generated by the user reciting the text; wherein the audio recording is used as a signature of the message signed by the user.

In another aspect of the invention, there is provided a method of transmitting an encrypted message. The method includes the steps of: converting the encrypted message to a covertext in a text form using a conversion method described herein; selecting an embedding text; embedding the covertext in the embedding text to generate a steganographic message; and transmitting the steganographic message containing the covertext.

In yet another aspect of the invention, there is provided a method of hiding a secret text in a proper text. The method includes the steps of: identifying modifiable parts of the proper text to generate a list of choices, the modifiable parts comprising grammatical and vocabulary changes to the proper text based on the list of choices, the changes not affecting meanings of the proper text; converting the list of choices to a bit string; assigning a cryptographic value to the bit string; converting the cryptographic value to a text, using a conversion method described herein; and modifying the modifiable parting using words from the text to obtain a watermarked proper text.

In one embodiment, a cryptographic value such as a public key or public key certificate is first compressed and then encoded in a text that is human readable. In another embodiment, a cryptographic value such as a public key is transformed to a paragraph that appears to be grammatically correct but does not necessarily convey any meaning.

In other aspects the invention provides various combinations and subsets of the aspects described above.

BRIEF DESCRIPTION OF DRAWINGS

For the purposes of description, but not of limitation, an embodiment or embodiments of the invention will now be explained in greater detail by way of example with reference to the accompanying drawings, in which.

DETAILED DESCRIPTION OF EMBODIMENTS

Figure 1:
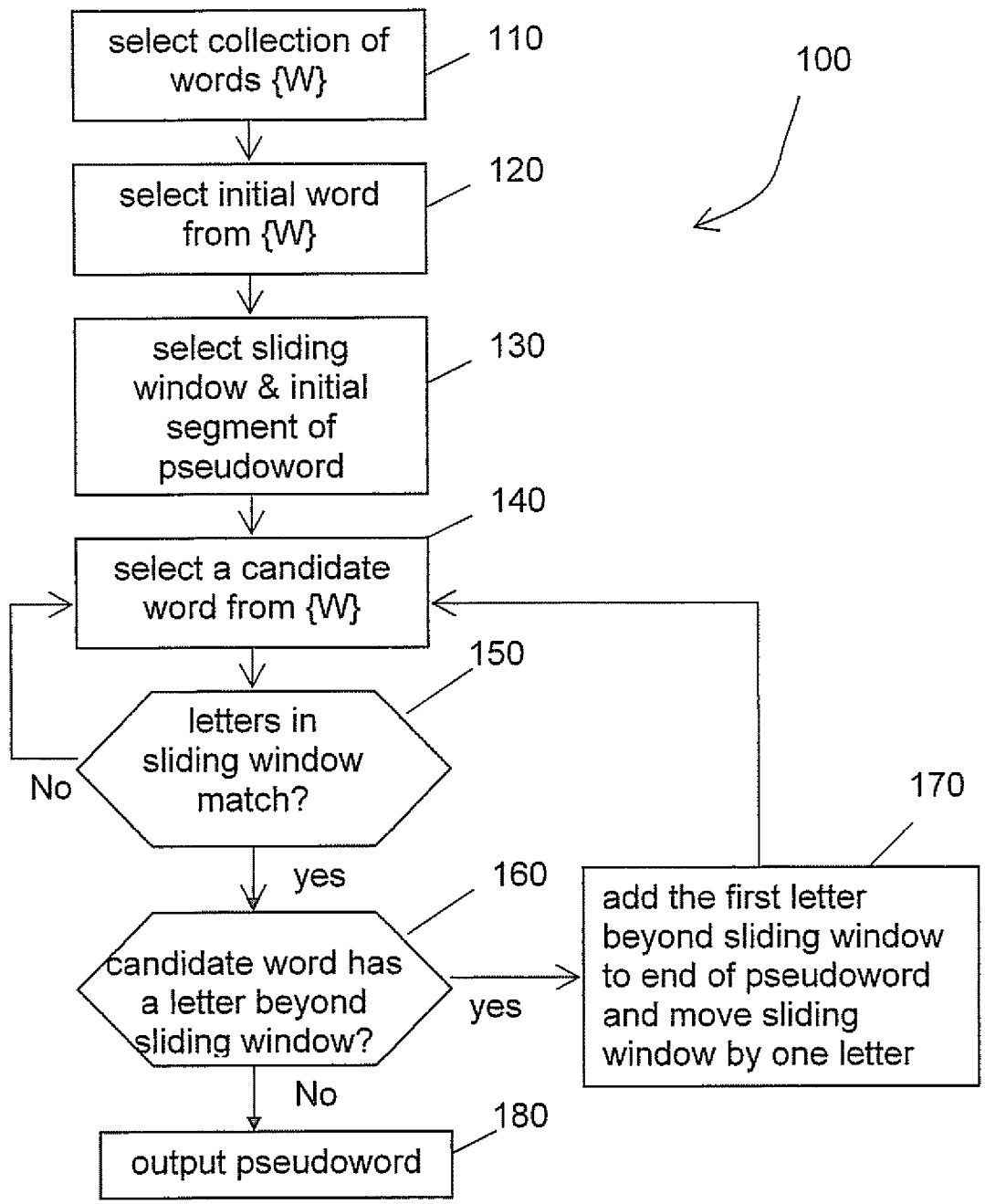
FIG. 1 illustrates schematically steps for generating a pseudoword for use in a process for generating a text representation of a public key.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

One approach to generating more manageable cryptographic values, such as public key, is to represent cryptographic values in a form that more resembles real words or sentences, or at least in a form that does not appear to be a collection of random characters. The method described below provides a user interface for transforming a cryptographic value, such as a public key, to a form that does not appear to be a collection of random characters. The user interface may be used by a certification authority, for example, to convert a public key certificate to a collection of pseudowords or even pseudosentences that, although may appear meaningless and perhaps consist of pseudowords only, are nevertheless apparently grammatically correct. The interface may also be used to transform public keys in a form that is more manageable for users, without having to expose the corresponding private keys to anyone. Although references are frequently made to transforming public keys, it will be understood that the interface is not limited to transforming public keys. Indeed, the interface, and the method embodied therein, can be applied to any cryptographic value, whether public keys, private keys, signatures, or encrypted text, among others.

Advantageously, a user interface that displays a public key to a user in a representation that is legible allows the user to obtain and type in a public key from print source, written source or spoken source, potentially be able to recall the public key from memory, so as to have mental storage from remote locations.

The legible public keys so obtained, if adequately formatted, can be used as addresses for e-mail or web-sites. In is manner, a web-site address or a person's e-mail address matches a public key used by the web-site or the person. For example, a web-site may advertise its address in print, and simultaneously thereby provide users its public key.

Representing public keys in a readable form may form the foundation of an alternative identity-based encryption ("IBE") system. In such an IBE system, each user is responsible for the selection and generation of its own private/public key pair. A user's private key is not exposed to any one. A user's public key is not represented in its usual form, a form which may appear to be a random collection of characters. Instead, the public key is converted and rendered in a legible representation. The public key in his form may form part of a user's identity, or may be used as a user's identity.

When rendering the whole public key, compactness of the public key is desirable, because users generally tend to be able to manage only small amounts of data, even if rendered legibly. Therefore, elliptic curve cryptography, with its small public key size, especially with point compression as described in a co-pending application, entitled "Method of Compressing a Cryptographic Value" and commonly assigned to the assignee, is considered more suitable for this technique.

The methods described herein incorporate the following features to make them more resistant to recording and re-splicing:

1. Instead of arbitrary lists of words, continuous grammatical sentences are used. An advantage of this feature is that the words will be connected and more difficult to splice together.
2. Instead of using short dictionaries of relatively short common words, larger dictionaries of rarer words are used. Users are less likely to use these words and are thus less likely to be recorded saying them.
3. Instead of using valid English words, pseudowords are constructed that have the property of not being used in everyday speech but having sufficient resemblance to valid English words to make them manageable for users.

Text decompression method is one way to render a cryptographic value such as a public key legible. A requirement of this approach is that text decompressed should always successfully compress because the public key must match exactly. In other words, text compression must exactly undo what the text decompression has done, i.e., the compression must be lossless.

In general terms, the method starts with taking a large amount of sample text of the variety that one wants the public key to appear as, then developing a text compression algorithm for this text. Next, one applies the text decompression algorithm to the public key to obtain the public key text. Text compression is a reverse process to find a numerical value that corresponds to a text string. In the following, the method is described by first describing a process for generating a collection of pseudowords as the sample text and then describing a compression algorithm and a corresponding decompression algorithm.

In one implementation, one starts with building a large collection of pseudowords as the sample text. A large collection of valid words, for example, a database of more than 80,000 valid English words can be selected as the starting point. To build a pseudoword, a random word of at least five letters is chosen to make the first four letters of the pseudoword. To determine the fifth letter of the pseudoword, another word from the database is chosen whose second, third and fourth letters match those of the current letters of the pseudoword. The fifth letter of the second word determines the fifth letter of the pseudoword. If the second word has only four letters, then the pseudoword is completed at the fourth letter of the second word. The end of a word is regarded as a virtual letter. If the pseudoword is not completed, then the sixth letter is determined by a random third word overlapping in the third, fourth and fifth letters. This is continued until the pseudoword is terminated. The pseudowords in Table 1 were generated according to the principles described above.

TABLE 1

Some random pseudowords whose four-letter segments are from valid English words conduedom, aboligance, bibletol, quotector, researly, metaji, phthanument, curvi, clydent, carned, corranshable, pariventialization, methrophysis, brestate, brige, basley, tophia, hymnassional, kickpermal, mitriage, unroundment, plagregator, biogamoreanically, monakish, monold, absonable, comparia, bindid, semicidization, herebrovable, lutochizes, enerview, euondy, podi, selephanthrophoretical, sigtown, satabolic, dossetta, stauroids, amendel, muscent, catchez, carbountology, malpracne, inconceptidental, phthalope, quadrage, breaty, twosometricalline, coro, zolane, norwax, celenility, malpomethalizing, colubrism In this way, every four-letter segment of the pseudoword matches the corresponding four-letter segment of a word in the database. This makes the pseudoword appear very plausible as a valid word, even though it may not be in the original database. In fact, if the pseudoword ends up as one of the valid words, it can be rejected, if desired. The plausibility of the pseudowords makes them easier for users to manage. Optionally, pseudowords can be generated with weighted probabilities. If a set of natural probabilities were assigned to the words in the database, pseudowords generated tend to appear more natural.

This process 100 is further illustrated in FIG. 1. First, at step 110, a collection of words is selected. As mentioned before, the collection of words may be a database of valid English words. As will be understood, other databases of words or groupings of characters can also be used. An initial candidate word is selected from the collection at step 120 from which the initial segment of the pseudoword is selected. Next, a sliding window for matching the next word is selected at step 130. The sliding window can be three consecutive characters, four consecutive characters, a single character, every other character, or some other groupings. The initial segment is determined from the initial candidate word and the sliding window. In this example, the sliding window consists of three consecutive characters and starts at the second character of the initial candidate word. The initial segment consists of the first four letters of the first candidate word.

Next, at step 140, a second word is selected from the collection and is compared with the initial candidate word at step 150. These two words are compared to determine they have a common segment, namely if their respective letters inside the sliding window match. If they do not, the process returns to step 140 to select next word until a matching word is found. At step 160, the matching word is examined to determine if it has at least one letter beyond the sliding window. If it has, a letter selected from the matching word outside the common segment, such as the first letter following the sliding window, is added to the end of the pseudoword, which at this time consists of the initial segment. The sliding window is then moved to the right by one letter at step 170 to include the new letter just added. The process then returns to step 130 to select next word from the collection until one is found such that the letters of the pseudoword in the sliding window match those of the selected word. The process terminates if a matching word has no letter beyond the sliding window or if a pre-selected word length of the pseudoword is reached. The pseudoword so formed is the output at step 180. Optionally, the generated pseudoword can be compared with words in the collection at step 180 to determine if it is an exact match of one existing word. If so, the generated word is rejected, and the process returns to step 120 to form a word that is not one of the "valid" words.

The number of pseudowords so generated may extend considerably beyond the number of valid words in the original database, depending on the length of the overlapping segments. As a result, pseudowords so formed can be used to convey more information than valid words.

Having generated a large collection of pseudowords, next we need to develop a compression/decompression algorithm. Each pseudoword can be made to correspond to a bit string. The mapping must be one-to-one so that any pseudoword can be recovered from a bit string and vice versa. Arithmetic encoding can be used to determine such a one-to-one mapping. Arithmetic encoding is known to be capable of forming the most compact compression possible. As such, it has the property that the compressed text has very little structure, meaning that virtually any random bit string is decompressible. In particular, it is quite amenable for text-decompressing random data like public keys. Using this technique, one uses the first four letters, for example, to determine the first division into subintervals of the half-open unit interval [0,1). This is a step of assigning a word to a subinterval. Which subinterval among the subintervals will the word be assigned to is determined using a deterministic relationship, an example of which is described in detail below. The subinterval itself is then further divided into smaller subintervals. The next four letters determine the next division into subintervals of the subinterval. Each four-letter segment moves one into a smaller subinterval. This coding is adaptive, because the probability distribution of the four-letter segment consisting of the second to fifth letters depends on first to fourth letters. Of course, although four-letter segments are used in this example, other groupings, for example, pairs of letters or three-letter segments, can also be used. Further, although arithmetic encoding is used as an example, other compressing/decompressing algorithms, such as Huffman encoding, also can be used.

Figure 2:
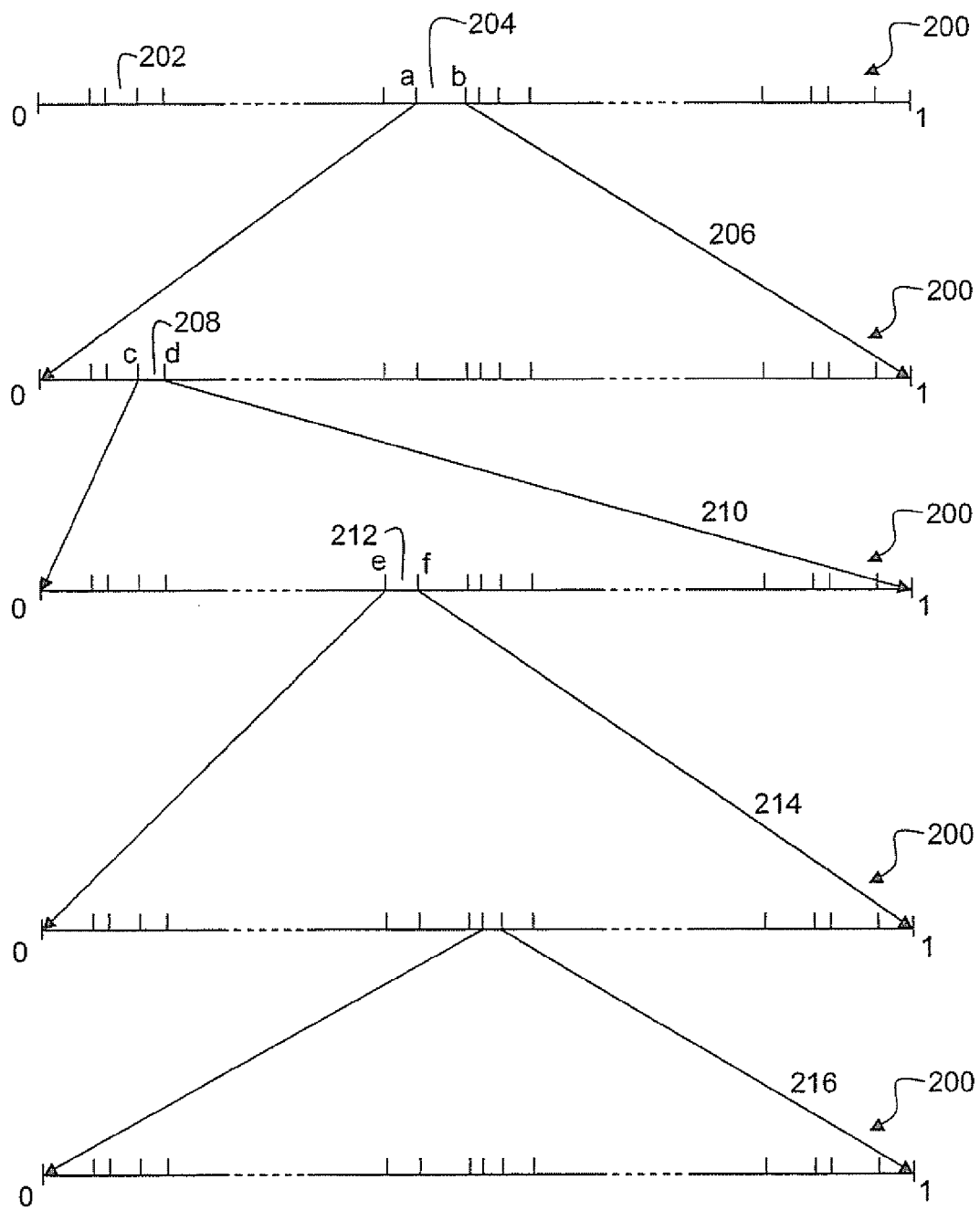
FIG. 2 illustrates schematically steps for encoding a text.

An example of this process is further illustrated in FIG. 2 and described in greater detail below. The first step is to tabulate the frequencies of groups of successive four characters in a sample collection. The sample collection may be pooled text, or a collection of pseudowords, such as that generated following the procedure shown in FIG. 1. Once the frequencies are tabulated, the frequencies are converted to probabilities, namely numbers within the half-open unit interval [0,1). It will be understood that this tabulation of frequencies or probabilities based on groupings of four characters is for convenience of illustration. Other groupings also can be used. For example, the frequencies can be based on single letters, groups of three letters, words, or other patterns. Also, text compression can use adaptive arithmetic coding, in which the frequencies change and even adapt to the text being compressed.

Next, the unit interval 200 or the half-open range [0,1), including 0 but not 1, is divided into subintervals 202 whose lengths correspond to each of the probabilities, proportional to the frequencies. These subintervals do not overlap. Each subinterval is half-open, in that it includes the lower value but not the higher value. The entire collection of the subintervals completely fill the unit interval [0,1). Each group of four characters is assigned a unique subinterval in the range [0,1). It is not important which subinterval is assigned to a particular group of four characters, as long as each subinterval uniquely maps to a group of four characters.

To assign a text string, such as a pseudoword, to a bit string, one first divides the text into successive groups of four characters. The last one is padded to four characters, if necessary. In order to successfully decompress encoded text to the original bit string, the same padding convention must be used for both compression and decompression processes. The first group determines the first subinterval 204, which has a range a to b, or [a,b), that includes a but not b. Thus, the text corresponds to a number in the subinterval 204, or range [a,b).

Next, the subinterval 204 is further subdivided, based on the same allocation of frequencies or probabilities to the unit interval [0,1). Namely, in a mapping 206, the interval [a,b) is mapped to the unit interval [0,1) which is subdivided. The next four characters determine the next subinterval 208, or range [c,d). In other words, it can be determined at this time that the text corresponds to a number that is greater than $$a+(b-a)*c$$

but smaller than $$a+(b-a)*d$$

If the text has more characters remaining, the next four characters are examined, which through a further mapping 210 moves the number to a more refined subinterval 212 [e,f) within the range [a+(b-a)*c, a+(b-a)*d). This process is repeated, through further mappings 214, 216, if necessary, until all characters in the text are exhausted and a final range is found. Thus, each group of four characters confines the number to a smaller subinterval. Essentially, this is an imbalanced radix expansion. Once the final range or subinterval is determined, the text can be set to correspond to a number in this range. Any convention can be used to select a number in this range as long as a corresponding convention is used when converting the number to the original text. One possibility is to select the starting point of the range as the final number.

Preferably, the number can be selected based on binary expansion as described below. It will be appreciated that as the subinterval gets smaller, the final range approaches a number between 0 and 1. The binary expansion of any number in this subinterval will be of the form $0.b_1 b_2 b_3 \ldots$, where each bit $b_i \in \{0,1\}$. In fact, because the subinterval is quite small, the value of the first n bits, for some n, will be the same for all numbers in the subinterval. Namely, all numbers in the subinterval can be expressed in the form $0.b_1 b_2 b_3 \ldots b_n + \Delta$ where $\Delta < \frac{1}{2}^n$. These bits, $b_1 b_2 b_3 \ldots b_n$, form the compressed value of the text.

Text decompression merely reverses the process above. It converts the bit string to a number in the interval 0 to 1, and then determines the corresponding subintervals, and converts these to the appropriate text.

Figure 3:
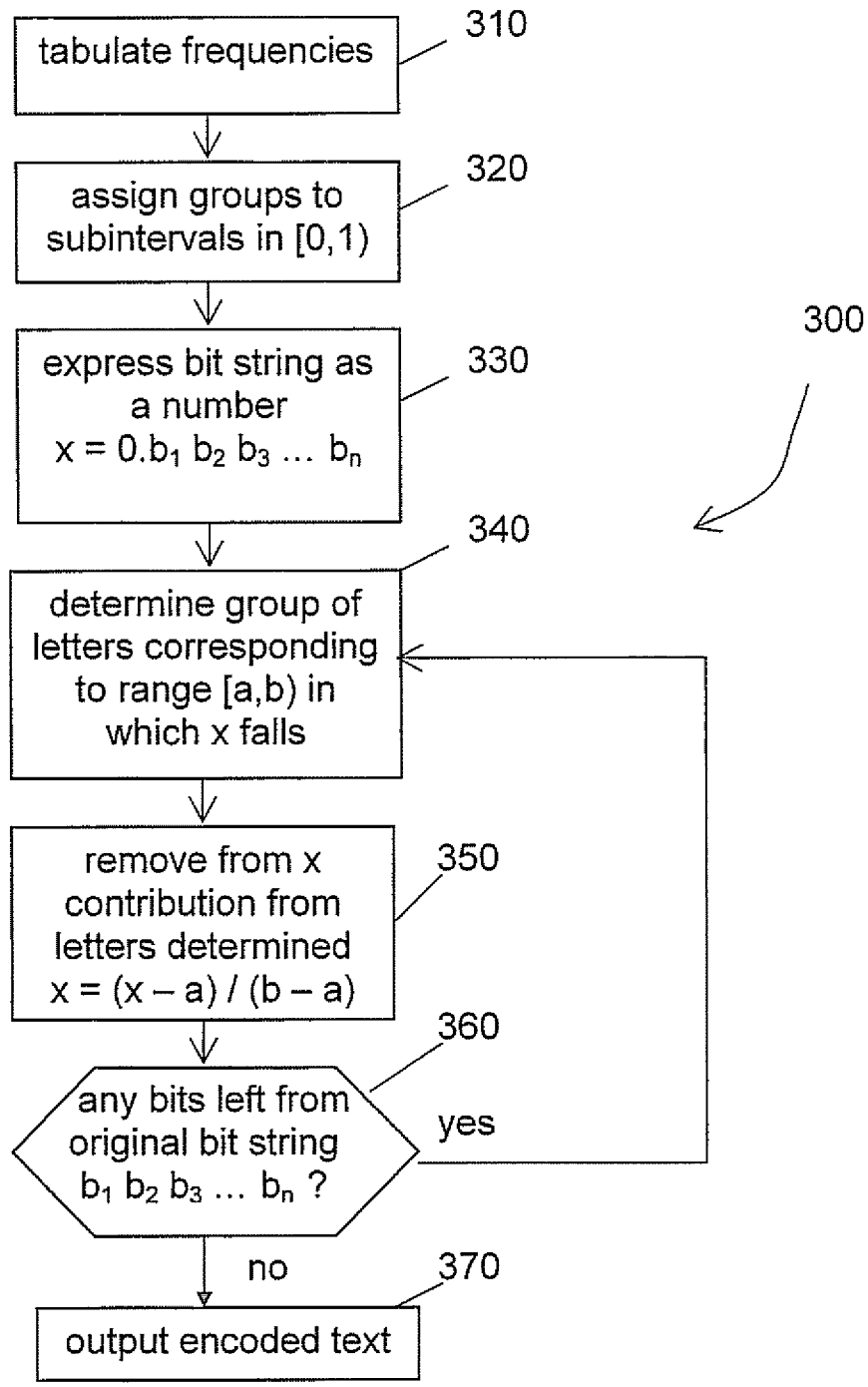
FIG. 3 illustrates schematically steps of a reverse process of that shown in FIG. 2, for decoding a bit string to a text that may be used as a public key.

FIG. 3 illustrates in detail the steps of a process 300 for decompressing a bit string and converting it to text. To initialize the process, frequencies of all possible successive four character groups are tabulated (step 310) and each group of four characters is assigned a subinterval 212 [e,f) in the unit interval [0,1) (step 320) as before. Next, the bit string $b_1 b_2 b_3 \ldots b_n$ is expressed as a number $x=0.b_1 b_2 b_3 \ldots b_n$ (step 330).

To find the first four characters from the bit string $b_1 b_2 b_3 \ldots b_n$, the subinterval, or range [a,b), in which the number x falls is first determined (step 340) from the mapping between groups of characters and subintervals. This determines the first four characters. To find the next four characters, the contribution of the determined four characters is removed from the number (step 350). To do so, the lower value of the range is subtracted from the number and the difference is divided by the range:

$$x_1 = (x-a)/(b-a)$$

The removal of the contribution is equivalent to removal of the most significant bits from the bit string $b_1 b_2 b_3 \ldots b_n$, or the remaining bits of the bit string, as the case may be. The process is repeated at step 340 to find the next subinterval or range [c,d), in which the number $x_1$ falls. As the process repeats, there will be a point at which no more bits from the bit string $b_1 b_2 b_3 \ldots b_n$ remain. This condition is tested at step 360 to terminate the process. If the last group contains any padding characters, the padding characters are removed. These groups of four characters, arranged in the order they have been determined, form the decompressed text. The decompressed text is output at a final step, step 370. Text decompressed from a bit string in this way can be used as a more manageable representation of cryptographic values, such as public keys, public key certificates, or encrypted text.

Optionally, it is advantageous to include some fault tolerance so that some minor errors made by a user can be corrected. (This is optional, because usually e-mail and web addresses do not include any significant fault tolerance.) To include fault tolerance, error detection or correction codes can be applied to the public key before text decompression. Upon text decompression, the public key text may contain certain redundancies such as correct spelling. So, when a user enters a public key text, it can first be spell corrected, then compressed, then error corrected. Such measures incur a slight cost but tend to make the system more usable.

Another approach to rendering a cryptographic value legible, the so-called "Grammatical Paragraph Method", is to make grammatically correct text. Generally speaking, grammatical sentences have certain redundancies that are not easily detected by generic compression techniques, even by adaptive arithmetic coding. Furthermore, text compression algorithms that are based on conventional sample text may be less efficient than is optimal. This is because sample text is semantically correct, and therefore has extra redundancy. Sentences that do not make semantic sense may well be usable as a user interface to cryptographic values. Because non-semantic sentences have less redundancy they can offer smaller representations.

TABLE 2

A Paragraph Encoding of 256-Bit Number 12345679012345679801234567901234567980123456790123456798012345679012345 67
No requiring fosterlings must not be this persona. Must they be leading? They had affected another partition. I do not shoot each swooning louse. Had I been treading? I may have been admiring any beaux. Do not imprison this extractability!

Table 2 illustrates the results of an exemplary implementation that converts numbers to paragraphs. A number is treated as a bit stream. The initial bits in the bit stream determine the initial sentence. The initial sentence consumes some bits of the stream, which is reduced via arithmetic coding. In arithmetic coding, bit streams are regarded as infinite, so a termination condition is tested for each sentence. If the stream is not yet terminated, then another sentence is generated. If the stream terminates at midsentence, then the remaining bits are set to zero, or padded with some other bit patterns that will also be used in decoding, until the last sentence terminates.

Figure 4:
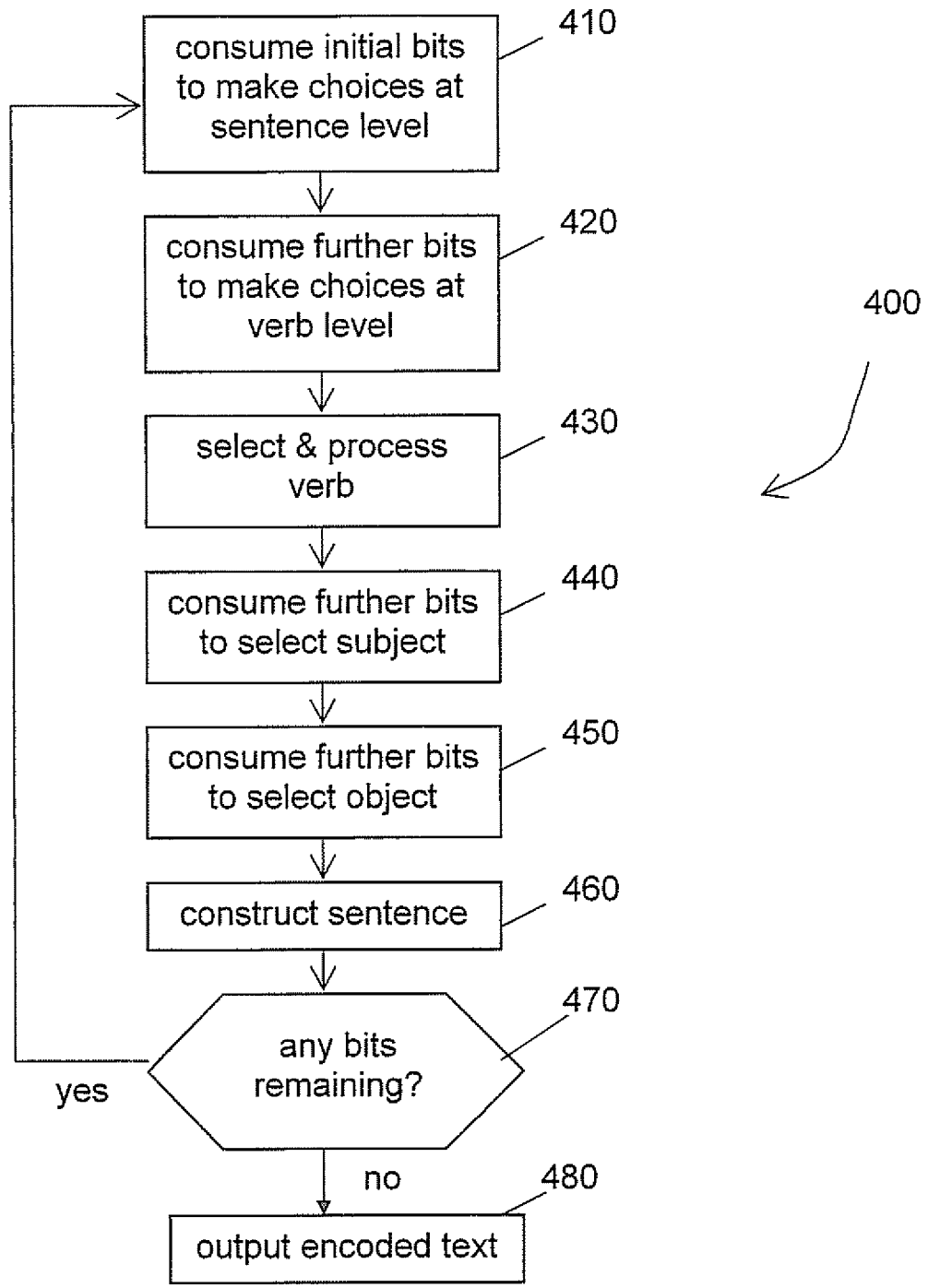
FIG. 4 illustrates steps for converting a bit stream, such as a public key, to a text that is grammatically correct.

FIG. 4 illustrates in detail the steps of an example adaptive process 400 for converting a bit stream to a text that is grammatically correct, but does not necessarily convey any meaning. Conveniently, the first step, step 410, is to use the initial bits to make certain choices about a sentence to be constructed. Namely, the initial bits are used to determine the constructed sentence at sentence level. For example, the first bits can be used to determine whether the sentence will be a statement, question or a command. Additionally, these first bits can also be used to determine whether the sentence will be a compound sentence or a simple sentence. The actual number of bits and how the values of these bits are assigned to a type of sentence is a design choice. As will be appreciated, other choices about the sentence at the sentence level can also be made at this time, which will consume more initial bits.

Next, at step 420, the next bits are consumed to determine some choices about the verb in the sentence. For example, they can be used to determine whether the main verb will be transitive or intransitive, what the tense of the verb is, and whether the sentence is positive or negative, among others. Once these choices have been made, the actual verb is selected from a vocabulary of verbs at step 430. Preferably, these candidate verbs are indexed and the verb whose index corresponding to the next group of bits is selected. Other correspondence between the verb and the group of bits may be used. Alternatively, the verb can also be selected in a deterministic algorithm that does not consume any bits of the stream. Other refinement of verb selection can be made. For example, it can be implemented to decide whether to use a regular or irregular verb before choosing the word, because this makes implementation slightly easier.

It will be appreciated that how the choices described above are made is not important, as long as the same correspondence, for example, the correspondence between groups of bits and tense of verb, is used in the reverse process. In addition, the order in which these choices are made is also not crucial. For example, whether the voice of the sentence or the tense of the verb is selected first tends not to have an impact on the generated sentence, nor the construction process. Yet, certain orders may be preferred. For example, selecting the sentence type first, i.e., determining first whether the sentence will be a statement, question or a command, may eliminate the need for making certain other choices. For example, if the sentence is a command, then certain tenses of the verb may not be used, or be less likely.

Next at step 440, the subject of the sentence is determined. Some bits will be consumed to determine whether the subject is singular or plural. The person of the subject is also determined. Further bits will be consumed to select a noun if the subject is neither first nor second person. Similarly, the objects of the sentence are determined at step 450, consuming more bits from the bit stream.

A sentence is constructed at step 460. This construction step is more than simply aggregating together all components determined in the above steps. The sentence is constructed grammatically. For example, if a question sentence is to be constructed, an appropriate auxiliary verb is first determined and then placed at the beginning of the sentence. As will be appreciated, grammatical sentences have certain redundancies that are not easily detected by generic compression techniques, even by adaptive arithmetic coding. Sentences that do not make semantic sense may well be usable as a user interface to cryptographic values. Further, as words are connected in a continuous grammatical sentence, it is generally more difficult to splice them together and therefore makes such a text representation of cryptographic values more resistant to security attacks.

After a sentence is constructed, if there are still more bits remaining in the bit stream (step 470), the process returns to step 410 to construct the next sentence. If all bits have been consumed, the sentence constructed will be the last sentence and all sentences constructed will be sent to an output (step 480). If not sufficient bits remain in the bit stream during the construction of the last sentence, the bit stream is padded until the last sentence can be constructed. Of course, the same padded bits will be removed during the decoding process when the text representation is converted back to a bit string.

It will be appreciated that the coding is adaptive. Therefore changes to the tail of stream only change the tail end of the coding. Table 3 illustrates this. The numbers in Tables 2 and 3 differ only in their trailing portions, shown in bold face. The first three sentences are identical to that shown in Table 2 before. In both examples, the fourth sentence is negative and in the first person. The trailing decimal zeros in the second number yield trailing zeros bits. These trailing bits have an effect on the remaining sentences and also account for the fourth, sixth and seventh sentences having a main verb "to be".

TABLE 3

A Paragraph Encoding of a 256-Bit Number with Trailing Zeroes

1234567901234567980123456790123456798011234500000000000000000000000000000000
No requiring fosterlings must not be this persona. Must they be leading? They had affected another partition. I was not being. Was every hungry ostracism swooning? Were you being them? You have copied another expertism. Its panicking pseudepigraphy might be.

As will be appreciated, the sentence construction process can be modified to include more varieties of sentences so that the paragraph can appear more "realistic". For example, the paragraph generated can use the passive voice, prepositions, compound words, dependent clauses, or comparisons. With these additional features added, more bits will be required to provide choices about sentences and the output text tends to be even shorter.

This encoding method tends to combine very well with a general method of compressing cryptographic values (such as public keys, key certificates or digital signatures). The following examples illustrate a method of compressing a cryptographic value.

Figure 5:
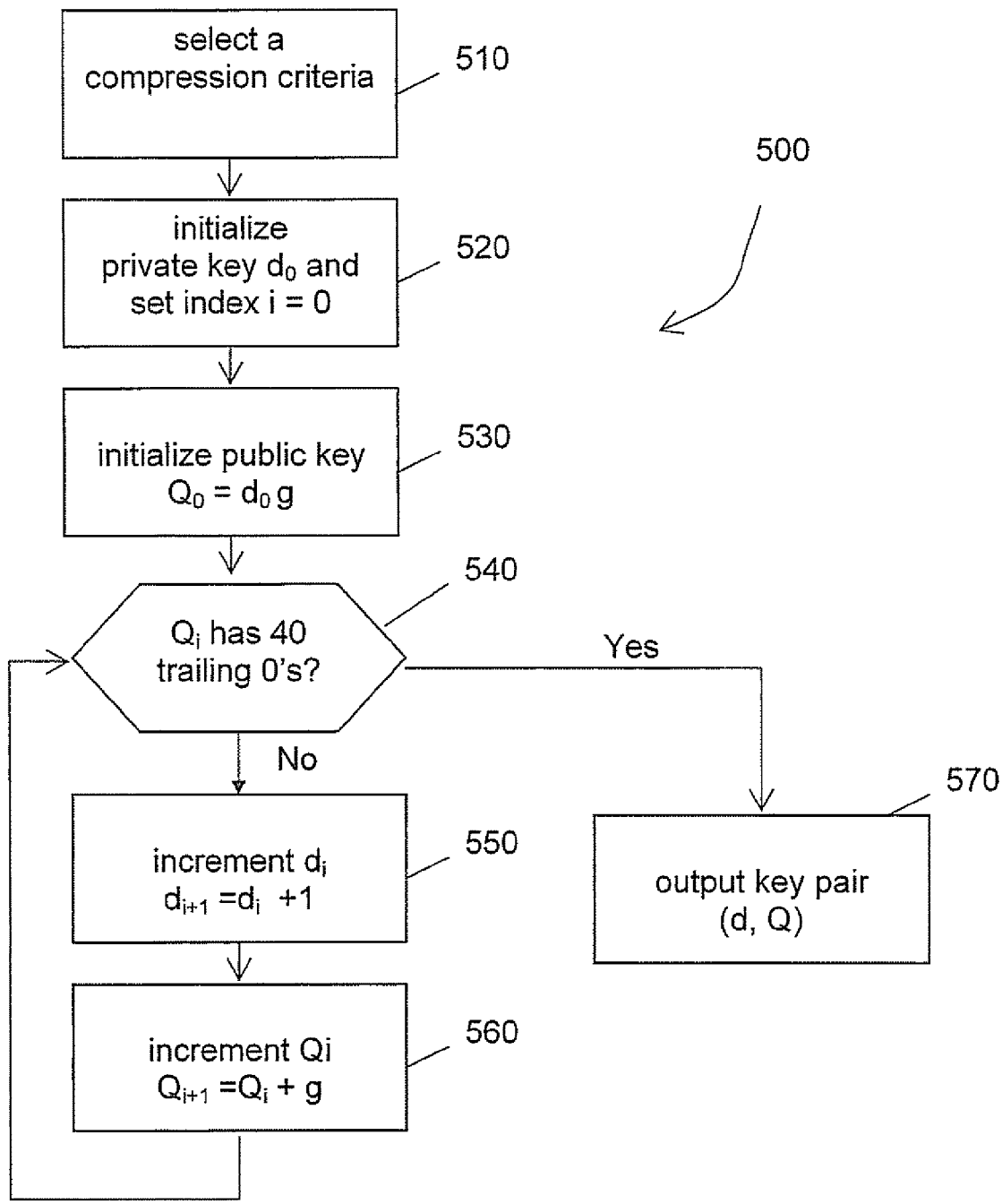
FIG. 5 illustrates steps of a method of compressing a public key that can be further transformed to a text form using the methods such as that illustrated in FIGS. 3 and 4.

FIG. 5 illustrates a method of compressing a public key. The compression process 500 starts at step 510 by selecting a compression criteria for a cryptographic value (a public key in this example). The criteria may be rule based, for example, by requiring all public keys to be selected from a predetermined collection of words or pseudowords. The criteria may also be pattern based, for example, by requiring the selected cryptographic value to have 40 trailing zeros. The criteria may also be to select a particular string or text for a given number of trailing characters or the entire cryptographic text, for example, to correspond to an e-mail address or a website address. The criteria may also be based on any other user selected requirements that may make a cryptographic value more manageable. Of course, the criteria may also be predetermined in another process or fixed by a third party, such as a request submitted to the system. The purpose of the criteria is that certain bits of the cryptographic value can be omitted during transmission and storage and then reconstructed prior to a further cryptographic operation, for example, decryption, to be performed on the cryptographic value. For illustration, the criteria will be requiring that a compressed public key must have 40 trailing zeros.

In a public key system, a public key is mathematically related to its corresponding private key. For example, an elliptic curve public key is a constant multiple of its corresponding private key, where the multiplier is the generator g of a selected elliptic curve of order n. The process 500 shown in FIG. 5 takes advantage of the multiplicative relationship between the private and public keys to avoid the multiplication operations otherwise required during an exhaustive search. The remaining steps of process 500 are as follows:

1. Initialize a private/public key pair $(d_0, Q_0)$, namely, first generate a random private key $d_0 \in [1, n-1]$ and set index i to 0 (step 520), and then compute the corresponding public key $Q_0 = d_0\, g$ (step 530);
2. In a loop, first evaluate whether the public key $Q_i$ meets the compression criteria (step 540), i.e., if it ends in 40 bits of zero;
3. If $Q_i$ is not in a compressed form, then
   (a) Increment the private key: $d_{i+1} = d_i + 1$ (step 550)
   (b) Increment the public key: $Q_{i+1} = Q_i + g$ (step 560)
   (c) Increment i by one
   (d) Return to the beginning of the loop (i.e., step 540)
4. Output the private/public key pair (d, Q) when a compressed key Q is found (step 570)

This process takes about $2^{40}$ iterations. Once a compressed key is obtained, the compressed key may be "encoded" using the method described in connection with FIG. 3 to obtain a text representation thereof.

As noted, cryptographical values are not limited to public keys. The following example illustrates the compression of CA digital signature inside a public key certificate. In a public key system, a public-key certificate is a data structure that consists of at least two parts, a data part and a signature part. The data part contains cleartext data that includes at least the public key to be certified and a piece of information indicating the identity of the public key's owner. The signature part consists of a digital signature over the data part. The digital signature is that of the certification authority, thereby binding the key owner's identity to the key certified.

Figure 6:
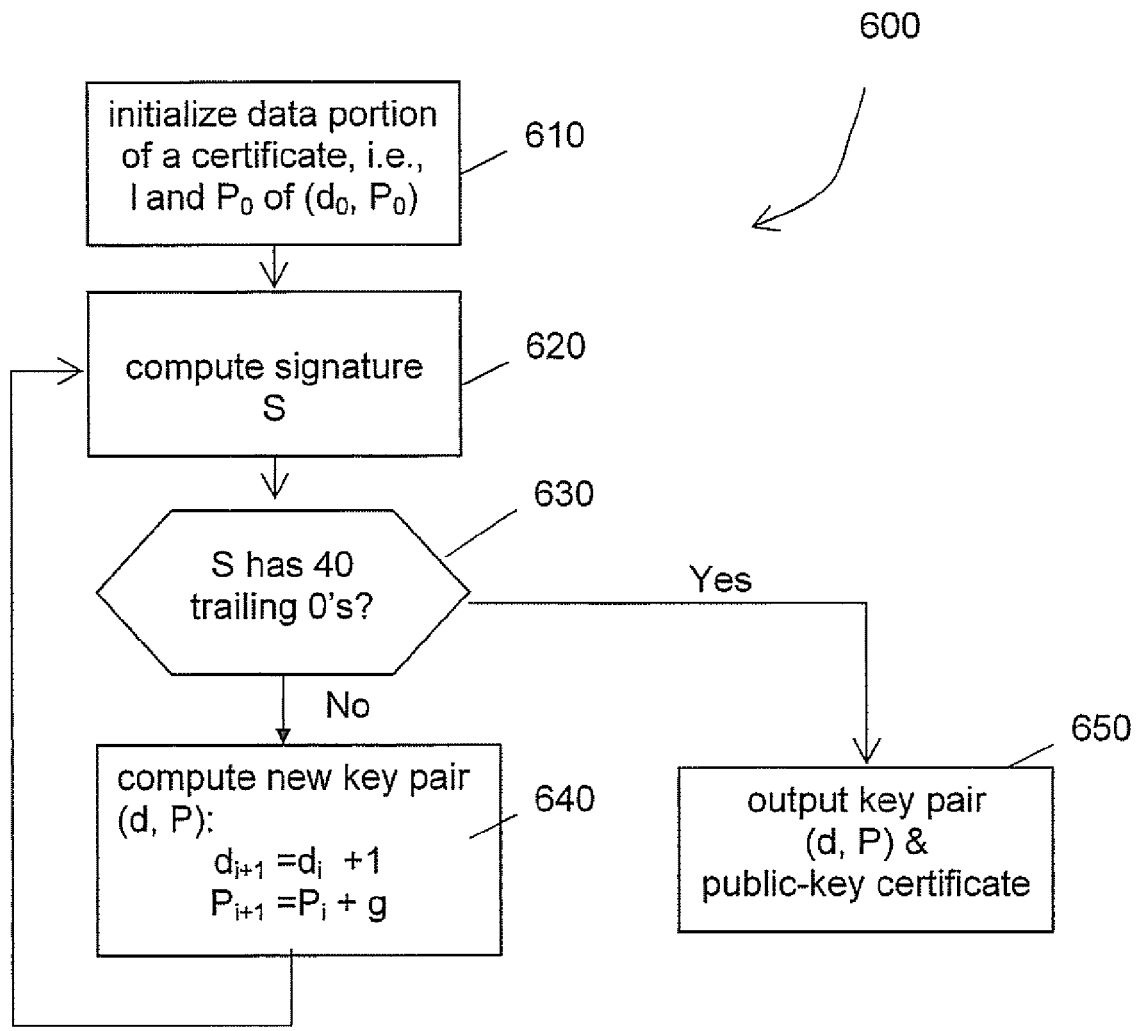
FIG. 6 illustrates steps of a method of compressing a public key certificate that can be further transformed to a text form.

The certification authority already has its public key Q and private key d selected and, in general, already has its public key publicized. The certificate of a public key of a subject entity therefore can be compressed in two different ways: (a) a suitable public key of the subject entity is appropriately selected as compressed, as described above, and (b) the signature of the CA is compressed. Both compression methods can be applied to a single certificate. FIG. 6 illustrates schematically how a public-key certificate can be compressed in an example embodiment. In this example, the compression criteria is to find a certificate that has 40 trailing zeros.

The CA initializes the process 600 by initializing the data part. During initialization 610, the CA selects an initial ephemeral private key $k_0$ of the subject and computes the corresponding initial ephemeral public key $R_0$. The CA also selects the identity information I to be included in the certificate. At step 620, the CA signs the initial data part to obtain an initial signature S using its fixed static private key d and its ephemeral private key $k_0$. For an ECDSA signature the signature S is computed as (r, s) where r is derived from the x-coordinate of $R_0$ and the s is computed as $(H(m)+d\ r)/k_0$ mod n, where H is a hash function, and n is the order of the elliptic curve group being used for ECDSA. The signature S computed is evaluated at step 630 to determine whether it has 40 trailing zeros, i.e., to determine if the signature meets the compression criteria.

In general, an arbitrary initial ephemeral public key does not lead to a compressed certificate. The CA then finds a new key pair at step 640. Advantageously, the CA can increment the ephemeral private key and compute the corresponding ephemeral public key by adding a corresponding increment:

$$k_{i+1}=k_i+1$$

$$R_{i+1}=R_i+g$$

Next, the process returns to step 620 and a digital signature corresponding to the new public key is computed. The new signature is evaluated at step 630 to determine whether it meets the criteria. If it does, the CA terminates the process and provides the subject entity with the key pair and the compressed public key certificate at step 650. If the signature does not meet the criteria, steps 620, 630, and 640 are repeated until a compressed certificate is found. The public-key certificate so obtained is compressed in that its signature part is compressed.

The compressed certificate can be farther converted to a more user friendly text representation, for example, using the process illustrated in FIG. 3. Similarly, the conversion to a text representation can also be performed as part of the compression processes shown in FIGS. 5 and 6. Generally, the more compressed a cryptographic value (e.g., a public key or a key certificate), the more manageable it becomes when rendered with a user-friendly interface.

As further applications of the text representation algorithms described above, we consider the following. To verbally sign a document (or any message including any text that may include seemingly random characters), a user computes its hash value, using a hash function or a secure hash function, such as SHA-1 or SHA-256. Such hashing is usually also done for public key signatures such as ECDSA and RSA, because messages are often longer than the public keys. The resulting hash is a bit string, and is a cryptographic value. Optionally, if the user has private key which is part of public key infrastructure such as ECC, then the user may generate a public key signature using the user's private key (and a cryptographic device or token). In either case, the user has a cryptographic value, whether it is simply a hash of the message to be signed or a public key signature. The methods described herein can be used to convert the cryptographical value to a text. The user now makes an audio or video recording in which he or she recites the text. This recording is a verbal signature of the message. For best security, the text should contain continuous grammatical language employing unusual words, or even pseudowords, that the user are not likely to utter in any other context. This prevents an attacker from taking other recordings of the user and splicing them together to appear as a verbal signature.

As yet another application of the text representations, suppose that a user wishes to send an encrypted message, say an email, without drawing attention to an observer of the email that encryption is being employed. The general terminology for this endeavour is steganography. A related problem is watermarking, where a user embeds one message into another to prove ownership. Existing steganography and watermarking techniques are generally applied to image and audio data, where there is room for imperceptible and even undetectable modifications. The present invention may be applied to text. In the case of steganography, a ciphertext of a message is generated using encryption, and then the present invention is applied to generate its text representation of the ciphertext, which is called the covertext. In the case of watermarking, a more refined text representation method is needed, as described below.

In watermarking as it applies to, one wishes to hide a secret text (the watermark) inside a larger text (the proper text). This invention can afford this by analyzing the proper text grammatically and semantically. Certain changes to the grammar and even to the vocabulary (such as substitutions by synonyms) do not alter the meaning of the text. The process therefore is to identify parts of proper text which can be modified without meaning change, whether these are minor grammatical changes, or minor vocabulary changes. For example, a word in the proper text may have several synonyms. Selecting one of the synonyms to replace the word may be one such minor vocabulary changes. A list of such minor changes, whether grammatical or vocabulary, can be compiled. The list of such minor changes can be converted to a bit string and vice versa. For example, if one particular word in the proper text was among a list of four synonyms, then the index of the word in is list of 4 words, e.g., either 1, 2, 3 of 4, may be converted to a pair of bits as 00, 01, 10 or 11, respectively. Again arithmetic encoding can be used with natural weighted probabilities based on how these minor grammar and vocabulary choices are made in typical text, so that the resulting encoding of a random bit string appears perfect natural, and a natural proper text encodes a random bit string. The resulting bit string can therefore be assigned any cryptographic value including a watermark.

The watermark can actually be the hash of some large message, or encryption of some other message. The embedded cryptographic value does not necessarily have any relation to the proper text in which it is embedded. However, it can be related to the proper text. In one embodiment, the embedded cryptographic value relates to an identifier of the proper text. This may be used, for example, to embed a serial number in the proper text to identify the proper text (i.e., a cleartext data) as a legally purchased copy of the cleartext data. This thus provides a method of tracking and identifying all authorized copies of the cleartext data distributed with permission and those unauthorized copies re-distributed without permission.

Various embodiments of the invention have now been described in detail. Those skilled in the art will appreciate that numerous modifications, adaptations and variations may be made to the embodiments without departing from the scope of the invention. Since changes in and or additions to the above-described best mode may be made without departing from the nature, spirit or scope of the invention, the invention is not to be limited to those details but only by the appended claims.

What is claimed is:

1. A method of communicating a cryptographic value to a human user, said method comprising:
   selecting a vocabulary comprising a plurality of pseudowords;
   representing the cryptographic value as a bit string;
   converting the bit string to a text using pseudowords selected from said vocabulary based on values of bits in the bit string in accordance with a pre-determined lossless relationship, wherein the values of a pre-defined number of said bits are used for determining a type of said pseudowords to be selected; and communicating the text to the human user.

2. The method of claim 1, wherein the step of representing the cryptographic value as a bit string comprises the steps of:
   (a) selecting a secret value;
   (b) performing a cryptographic operation on said secret value to generate the cryptographic value;
   (c) determining whether a trial bit string corresponding to the cryptographic value satisfies a pre-determined criteria;
   (d) repeating the sequence of steps (a) to (c) until the trial bit string satisfies the pre-determined criteria; and
   (e) assigning said trial bit string to said bit string.

3. A method of communicating a public key of a recipient to users of an identity-based encryption ("IBE") system, said method comprising:
   selecting a vocabulary comprising a plurality of pseudowords;
   representing the public key as a bit string;
   encoding the bit string to a text following a reverse arithmetic encoding algorithm utilizing pseudowords selected from the vocabulary based on values of bits in the bit string, wherein the values of a pre-defined number of said bits are used for determining a type of said pseudowords to be selected; and
   communicating the text to the recipient as an identity of the recipient.

4. The method of claim 3, wherein the public key belongs to a private/public key pair defined on an elliptic curve of order n and with a generator g, and the step of representing the public key comprises the steps of:
   (a) initializing the public key and a corresponding private key, said private key being selected randomly from [1,n);
   (b) determining whether the public key satisfies a compression criteria; and
   (c) if the compression criteria is not satisfied, incrementing the private key by 1, incrementing the public key by g and repeating the steps (b) to (c) until the compression criteria is satisfied.

5. A method of communicating a cryptographic value to a user, said method comprising:
   selecting a vocabulary comprising a plurality of pseudowords;
   representing the cryptographic value as a bit string;
   converting the bit string to grammatically correct text formed of pseudowords selected from said vocabulary, wherein values of a pre-defined number of bits from said bit string are used for determining a type of said pseudowords to be selected; and
   communicating said grammatically correct text to said user.

6. The method of claim 5, wherein the step of converting the bit string comprises the steps of:
   (a) dividing the bit string into at least a first section, a second section and a third section;
   (b) selecting a sentence type based on values of the first section;
   (c) selecting verb form based on values of the second section;
   (d) selecting pseudowords for constructing a grammatically correct sentence based on values of a first portion of the third section; and
   (e) constructing the grammatically correct sentence from the selected sentence type, the selected verb form, and the selected pseudowords.

7. The method of claim 6, wherein the step of converting the bit string comprises further the steps of:
   subtracting the first portion from the third section to obtain a second portion;
   upon determining said second portion to be of a positive length, repeating the steps (a) to (e) to convert said second portion to additional grammatically correct text and appending said additional grammatically correct text to said grammatically correct text formed in previous steps (a) to (e), wherein in said repeated steps (a) to (e), said second portion is used in place of said bit string.

8. The method of claim 1, further comprising signing a message by a user, the method further comprising the steps of:
   computing a hash value of said message;
   converting said hash value to a text using the conversion;
   receiving an audio recording, said audio recording capturing voice signal generated by the user reciting said text;

wherein said audio recording is used as a signature of said message signed by the user.

9. The method of claim 8, wherein the hash value is computed using a secure hash function.

10. The method of claim 5, further comprising signing a message by a user, the method comprising the steps of:
    computing a hash value of said message;
    converting said hash value to a text using the conversion;
    receiving an audio recording, said audio recording capturing voice signal generated by the user reciting said text;

wherein said audio recording is used as a signature of said message signed by the user.

11. The method of claim 10, wherein the hash value is computed using a secure hash function.

12. A method of transmitting an encrypted message, comprising the steps of:
    selecting a vocabulary comprising a plurality of pseudowords;
    representing the encrypted message as a bit string;
    converting the bit string to a covertext that is a grammatically correct text formed of pseudowords selected from said vocabulary based on values of bits in the bit string, wherein values of a pre-defined number of bits from the bit string are used for determining a type of said pseudowords to be selected;
    selecting an embedding text;
    embedding said covertext in said embedding text to generate a steganographic message; and
    transmitting said steganographic message containing said covertext.

13. The method of claim 12, wherein the step of converting the bit string comprises the steps of:
    (a) dividing the bit string into at least a first section, a second section and a third section;
    (b) selecting a sentence type based on values of the first section;
    (c) selecting verb form based on values of the second section;
    (d) selecting pseudowords for constructing a grammatically correct sentence based on values of a first portion of the third section; and
    (e) constructing the grammatically correct sentence from the selected sentence type, the selected verb form, and the selected pseudowords.

14. The method of claim 13, wherein the step of converting the bit string comprises further the steps of:
- subtracting the first portion from the third section to obtain a second portion;
- upon determining said second portion to be of a positive length, repeating the steps (a) to (e) to convert said second portion to additional grammatically correct text and appending said additional grammatically correct text to said grammatically correct text formed in previous steps (a) to (e), wherein in said repeated steps (a) to (e), said second portion is used in place of said bit string.

15. The method of claim 1, further comprising hiding a secret text in a proper text, the method further comprising the steps of:
- identifying modifiable parts of the proper text to generate a list of choices, said modifiable parts comprising grammatical and vocabulary changes to the proper text based on said list of choices, said changes preserving meanings of the proper text;
- converting said list of choices to a bit string;
- assigning a cryptographic value to said bit string;
- converting said cryptographic value to a text, using the conversion; and
- modifying said modifiable parts using words from said text to obtain a watermarked proper text.

16. The method of claim 15, wherein the secret text is a character string for uniquely identifying the proper text.

17. The method of claim 16, wherein the character string is a serial number.

* * * * *